US012811218B2

(12) United States Patent
Yoo et al.

(10) Patent No.: US 12,811,218 B2
(45) Date of Patent: Nov. 24, 2026

(54) BATTERY CELL ASSEMBLY WITH HEAT INSULATING MEMBER AND BATTERY MODULE INCLUDING SAME

(71) Applicant: SK On Co., Ltd., Seoul (KR)

(72) Inventors: Tak Kyung Yoo, Daejeon (KR); Seo Roh Rhee, Daejeon (KR); Seung Hun Lee, Daejeon (KR); Yang Kyu Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 719 days.

(21) Appl. No.: 18/180,127

(22) Filed: Mar. 8, 2023

(65) Prior Publication Data

US 2023/0291036 A1 Sep. 14, 2023

(30) Foreign Application Priority Data

Mar. 14, 2022 (KR) ........................ 10-2022-0031681

(51) Int. Cl.
*H01M 10/658* (2014.01)
*H01M 50/204* (2021.01)
*H01M 50/533* (2021.01)

(52) U.S. Cl.
CPC ....... *H01M 10/658* (2015.04); *H01M 50/204* (2021.01); *H01M 50/533* (2021.01)

(58) Field of Classification Search
CPC . H01M 10/658; H01M 50/533; H01M 50/204
See application file for complete search history.

(56) References Cited

U.S. PATENT DOCUMENTS

2017/0018746 A1 1/2017 Kritzer et al.
2019/0189979 A1* 6/2019 Choi .................. H01M 10/482
2020/0295337 A1* 9/2020 You ...................... H01M 50/50
2020/0365853 A1* 11/2020 Hashimoto ......... H01M 10/625
2022/0393322 A1* 12/2022 Jang ................... H01M 10/658

FOREIGN PATENT DOCUMENTS

CN 108336452 A * 7/2018 .......... H01M 10/613
CN 211088348 U 7/2020
KR 20150138198 A 12/2015

OTHER PUBLICATIONS

CN_108336452 English Translation (Year: 2018).*
Extended European Search Report for the European Patent Application No. 23161482.7 issued by the European Patent Office on Nov. 28, 2023.
Partial European Search Report for the European Patent Application No. 23161482.7 issued by the European Patent Office on Jul. 18, 2023.

* cited by examiner

*Primary Examiner* — Jimmy Vo
(74) *Attorney, Agent, or Firm* — IP & T GROUP LLP

(57) ABSTRACT

A battery cell assembly includes a first battery cell, a second battery cell disposed to face the first battery cell, a protective member disposed between the first battery cell and the second battery cell, and a support member coupled to at least one side of the protective member and supporting the protective member. The protective member includes a heat insulating member preventing heat propagation between the first battery cell and the second battery cell.

10 Claims, 11 Drawing Sheets

BATTERY CELL ASSEMBLY WITH HEAT INSULATING MEMBER AND BATTERY MODULE INCLUDING SAME

CROSS-REFERENCE TO RELATED APPLICATION(S)

This application claims benefit of priority to Korean Patent Application No. 10-2022-0031681 filed on Mar. 14, 2022 in the Korean Intellectual Property Office, the disclosure of which is incorporated herein by reference in its entirety.

BACKGROUND

1. Field

The present disclosure relates to a battery cell assembly and a battery module including the same.

2. Description of Related Art

Secondary batteries, unlike primary batteries, have convenience in that they may be charged and discharged, and are thus attracting much attention as the power of various mobile devices and power sources for electric vehicles and the like. For example, a secondary battery of the type using a high energy density non-aqueous electrolyte has good output and is used to drive a motor of an electric vehicle by connecting a plurality thereof in series.

Battery modules applied to electric vehicles are modularized by electrically connecting a plurality of secondary battery cells due to the need for high output and high capacity. Electric vehicles include a plurality of such battery modules to obtain high power.

In order to construct a high-capacity and large-area battery module, the number of battery cells included in the battery module may increase. Accordingly, the structure of the battery module is simplified to improve assembly efficiency with battery cells and other components, and the need to reduce the weight of battery modules is increasing.

In addition, the electrode assembly of the battery cell generates heat through the process of charging and discharging. Due to this heat generation, the internal temperature of the battery module rises, resulting in deterioration of electrical performance or ignition. Furthermore, when a large number of secondary battery cells are mounted in a battery module, there may be a problem in that flames generated by ignition of one battery cell may be transferred to other battery cells in the vicinity, causing a chain of ignition or explosion.

On the other hand, the battery module according to the related art has a problem in that heat dissipation and cooling performance is deteriorated due to a complicated heat transfer path from the battery cell to the outside.

SUMMARY

An aspect of the present disclosure is to provide a battery cell assembly in which a heat insulating member is disposed between battery cells to block heat propagation.

An aspect of the present disclosure is to provide a battery cell assembly having a simple structure and improved assembly efficiency, and a battery module including the same.

An aspect of the present disclosure is to provide a battery module in which heat dissipation efficiency is increased by reducing a heat transfer path of a battery cell.

According to an aspect of the present disclosure, a battery cell assembly includes a first battery cell; a second battery cell disposed to face the first battery cell; a protective member disposed between the first battery cell and the second battery cell; and a support member coupled to at least one side of the protective member and supporting the protective member. The protective member includes a heat insulating member preventing heat propagation between the first battery cell and the second battery cell.

The heat insulating member may include at least one of mica, ceramic wool, and aerogel.

The protective member may further include a compression member disposed in at least one of between the first battery cell and the heat insulating member or between the second battery cell and the heat insulating member.

At least one of the first battery cell and the second battery cell may be adhered to the compression member, and the support member may be coupled to the heat insulating member.

The first battery cell and the second battery cell may face each other in a first direction, and the support member may include a first support member and a second support member spaced apart in a second direction, perpendicular to the first direction and respectively coupled to the protective member.

At least one of the first support member and the second support member may include a body portion coupled to the protective member; and a flange portion disposed on an end of the body portion, and the flange portion may have a support surface parallel to the first direction.

The flange portion may include a coupling protrusion protruding in the first direction.

The flange portion may further include a coupling groove disposed on an opposite side of a protruding side of the coupling protrusion, and a shape of the coupling groove may correspond to a shape of the coupling protrusion.

At least one of the first battery cell and the second battery cell may be spaced apart in a third direction with respect to a virtual line connecting the support surface of the first support member and the support surface of the second support member, and the third direction may be perpendicular to both the first direction and the second direction.

The first battery cell may include a first lead tab at least partially bent, and the second battery cell may include a second lead tab contacting the first lead tab.

The first lead tab may include a first connection portion contacting the second lead tab, and the second lead tab may include a second connection portion in contact with the first connection portion. The first connection portion and the second connection portion may face the first support member in the second direction.

The first support member may include one or more guide grooves disposed on a surface facing the first connection portion and the second connection portion, and the first connection portion and the second connection portion may be welded to each other in a welding region provided along the one or more guide grooves.

The one or more guide grooves, the first connection portion and the second connection portion may be sequentially disposed in a direction opposite to a direction from the first support member to the second support member.

According to an aspect of the present disclosure, a battery module includes a plurality of battery cell assemblies coupled to each other. At least one of the plurality of battery cell assemblies includes a plurality of battery cells; a heat insulating member disposed between any two of the plurality of battery cells; and a support member guiding coupling with other battery cell assemblies.

The support member may include a first support member and a second support member disposed on both ends of the heat insulating member.

The plurality of battery cell assemblies may include a first battery cell assembly and a second battery cell assembly coupled to each other, and the first support member of the first battery cell assembly may include a first coupling protrusion protruding toward the second battery cell assembly.

The first support member of the second battery cell assembly may include a first coupling groove in which the first coupling protrusion is accommodated.

The second support member of the second battery cell assembly may include a second coupling protrusion protruding toward the first battery cell assembly, and the second support member of the first battery cell assembly may include a second coupling groove in which the second coupling protrusion is accommodated.

The plurality of battery cells may include a first battery cell and a second battery cell facing each other, the first battery cell may include a first lead tab, and the second battery cell may include a second lead tab electrically connected to the first lead tab.

The first battery cell and the second battery cell may face each other in a first direction, and the first lead tab may include a connection portion facing the second lead tab in a second direction, perpendicular to the first direction.

The connection portion may be welded to the second lead tab.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
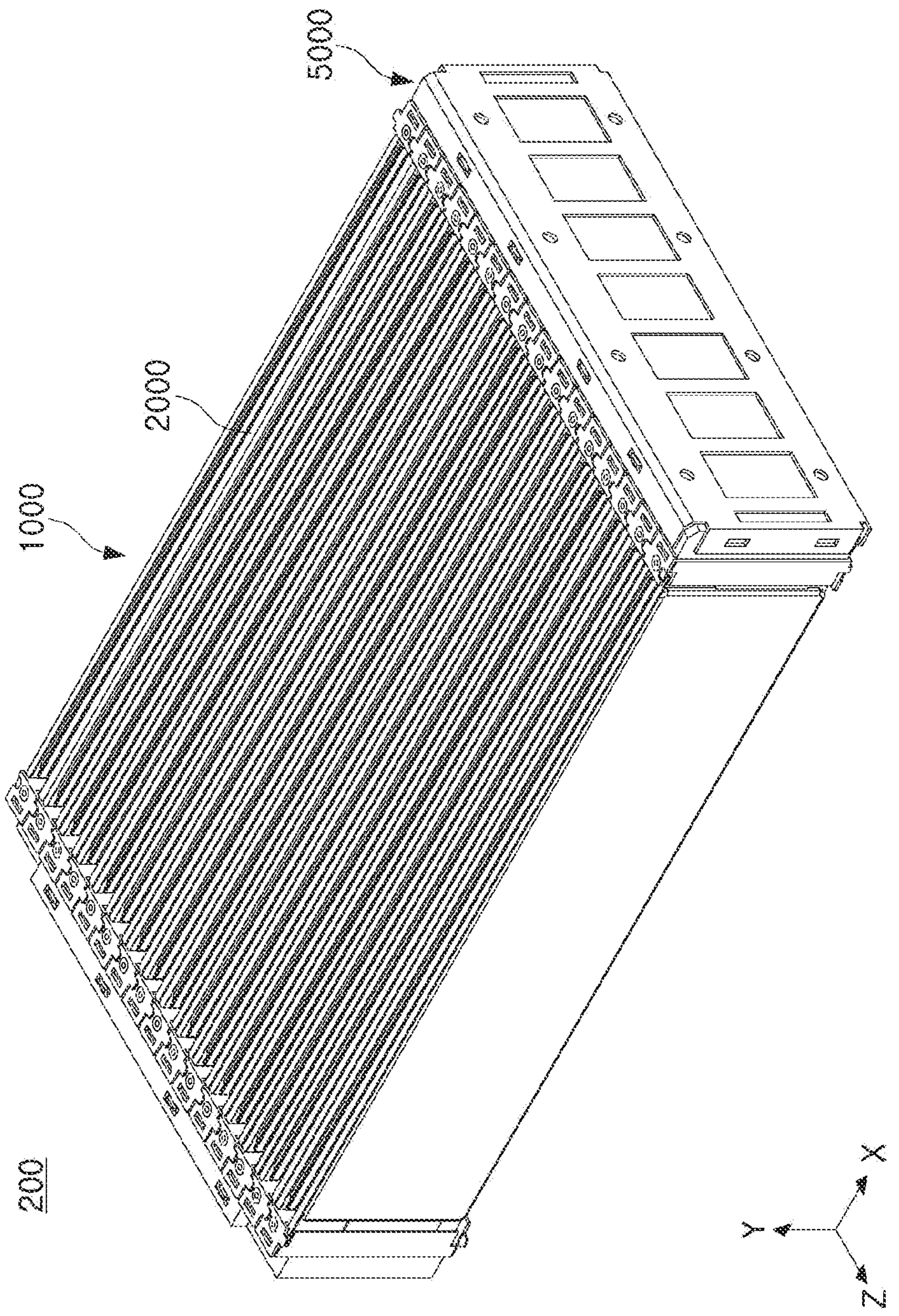
FIG. 1 is a perspective view of a battery module.

The terms or words used in the present specification and claims described below should not be construed as being limited to conventional or dictionary meanings, and based on the principle that an inventor may appropriately define the concept of a term in order to best describe his invention, it should be interpreted as meaning and concept consistent with the technical spirit of the present disclosure. Therefore, the configurations illustrated in the embodiments and drawings described in this specification are only the most preferred embodiments of the present disclosure, and do not represent all of the technical spirit of the present disclosure, and it should be understood that various equivalents and modifications may be substituted for the same at the time of filing.

Hereinafter, preferred embodiments of the present disclosure will be described with reference to the accompanying drawings. However, the embodiment of the present disclosure may be modified in various other forms, and the scope of the present disclosure is not limited to the embodiments described below. In addition, the embodiments of the present disclosure are provided to more completely explain the present disclosure to those of ordinary skill in the art. The shapes and sizes of elements in the drawings may be exaggerated for clearer explanation.

Also, in this specification, the singular expression includes the plural expression unless the context clearly dictates otherwise. Throughout the specification, the same reference signs refer to the same elements or corresponding elements.

In addition, in the present specification, expressions such as upper side, upper portion, lower side, lower portion, side surface, front side, back side, and the like are expressed based on the direction illustrated in the drawings, and if the direction of the corresponding object is changed, it may be expressed differently.

In addition, terms including an ordinal number, such as "first," "second," etc. used herein may be used to describe various elements, but the elements are not limited by the terms, and the above terms are used only for the purpose of distinguishing one component from another. For example, without departing from the scope of the present disclosure, a first component may be referred to as a second component, and similarly, a second component may also be referred to as a first component.

Figure 2:
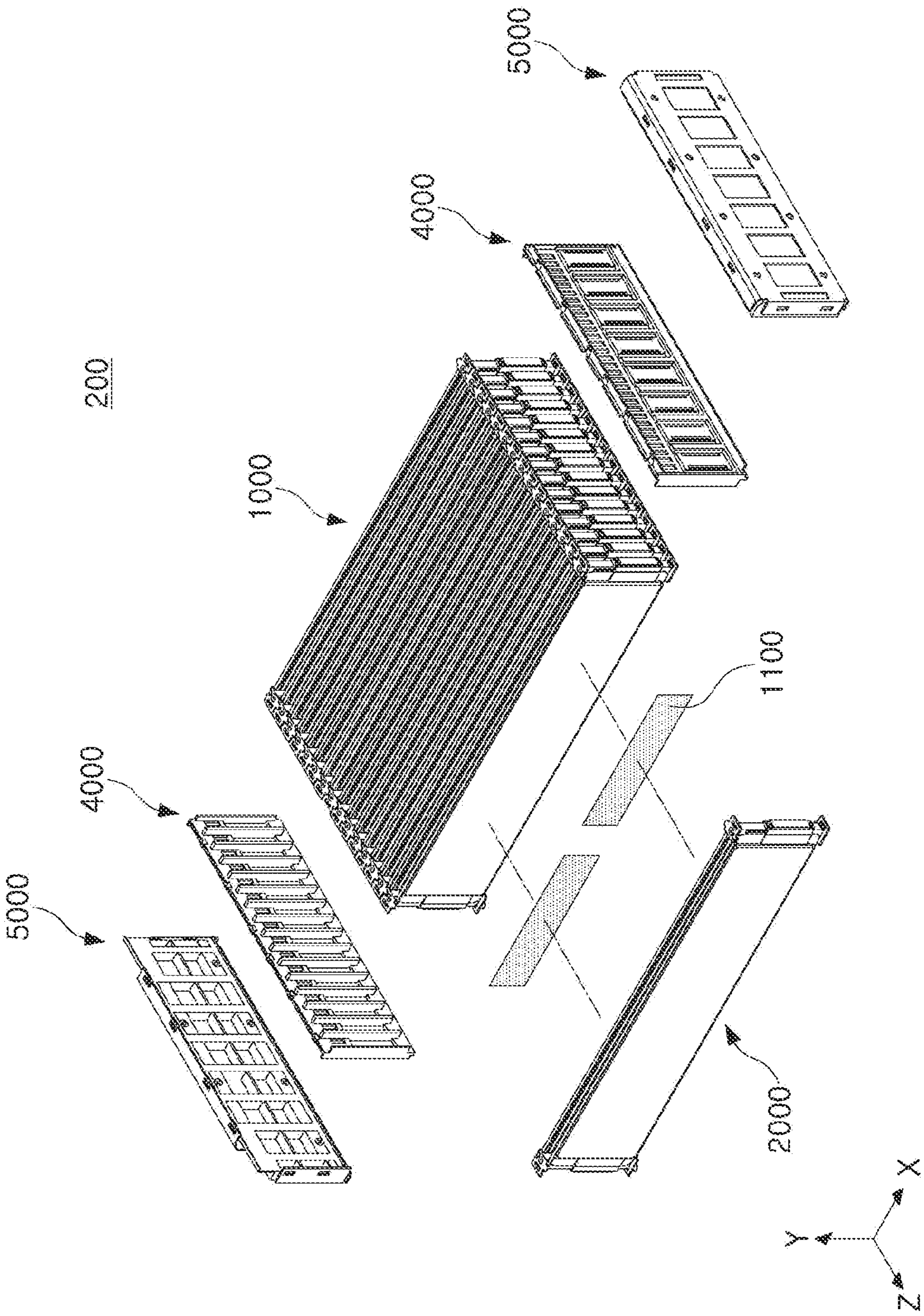
FIG. 2 is an exploded perspective view of a battery module.

FIG. 1 is a perspective view of a battery module 200 according to embodiments. FIG. 2 is an exploded perspective view of the battery module 200.

The battery module 200 may include one or more battery cell assemblies 2000 for outputting or storing electrical energy, a busbar assembly 4000 electrically connected to the battery cell assembly 2000, and a cover assembly 5000 covering the busbar assembly 4000.

The battery module 200 may include a plurality of battery cell assemblies 2000. For example, as illustrated in FIG. 1 or 2, the battery module 200 may include a plurality of battery cell assemblies 2000 stacked and coupled in one direction (e.g., Z-axis direction). The battery cell assembly 2000 may include one or more battery cells 2100 to charge or discharge electrical energy.

The plurality of battery cell assemblies 2000 may be stacked in one direction (e.g., the Z-axis direction of FIG. 1) to form a cell stack 1000. To fix the plurality of battery cell assemblies 2000 to each other, an adhesive member 1100 may be disposed between the battery cell assemblies 2000. One battery module 200 may include at least one cell stack 1000, and the number of battery cell assemblies 2000 included in each cell stack 1000 may vary.

One battery cell assembly 2000 may be considered as a manufacturing unit of the battery module 200. For example, a manufacturer may determine the number of battery cell assemblies 2000 according to a power value required for the battery module 200 and assemble the battery cell assemblies together to manufacture the battery module 200. For example, the battery module 200 illustrated in FIG. 1 may be formed by combining 16 battery cell assemblies 2000.

In embodiments, the busbar assembly 4000 may be disposed on at least one side of the cell stack 1000 to electrically connect the battery cell assemblies 2000 to each other. The busbar assemblies 4000 may be provided as a pair and disposed on both ends of the cell stack 1000, respectively. However, the pair of busbar assemblies 4000 may be integrally formed by being connected to each other.

In embodiments, the cover assembly 5000 may be coupled to the busbar assembly 4000 or the cell stack 1000 to cover the busbar assembly 4000. The cover assembly 5000 may prevent the busbar assembly 4000 from being short-circuited with other members and protect the same from external impact. In addition, the cover assembly 5000 may prevent high-temperature thermal energy or flame generated from the battery cell assembly 2000 from propagating to other adjacent components (e.g., other adjacent battery modules).

In embodiments, in the case of the battery cell assembly 2000, a plurality of battery cell assemblies 2000 may be stacked to form the body of the battery module 200. For example, as illustrated in FIG. 1 or 2, the battery module 200 may be configured so that the cell stack 1000 itself forms the body of the battery module 200 without a separate case or housing. A manufacturer may freely adjust the size of the battery module 200 by configuring the number of battery cell assemblies 2000 in various manners. In addition, as the case or housing is omitted, the battery cell assembly 2000 is directly exposed externally, and the heat dissipation efficiency of the battery module 200 may increase.

The battery cell assembly 2000 may be configured to facilitate stack assembly. Hereinafter, the battery cell assembly 2000 according to embodiments will be described in detail with reference to FIGS. 3 and 4.

Figure 3:
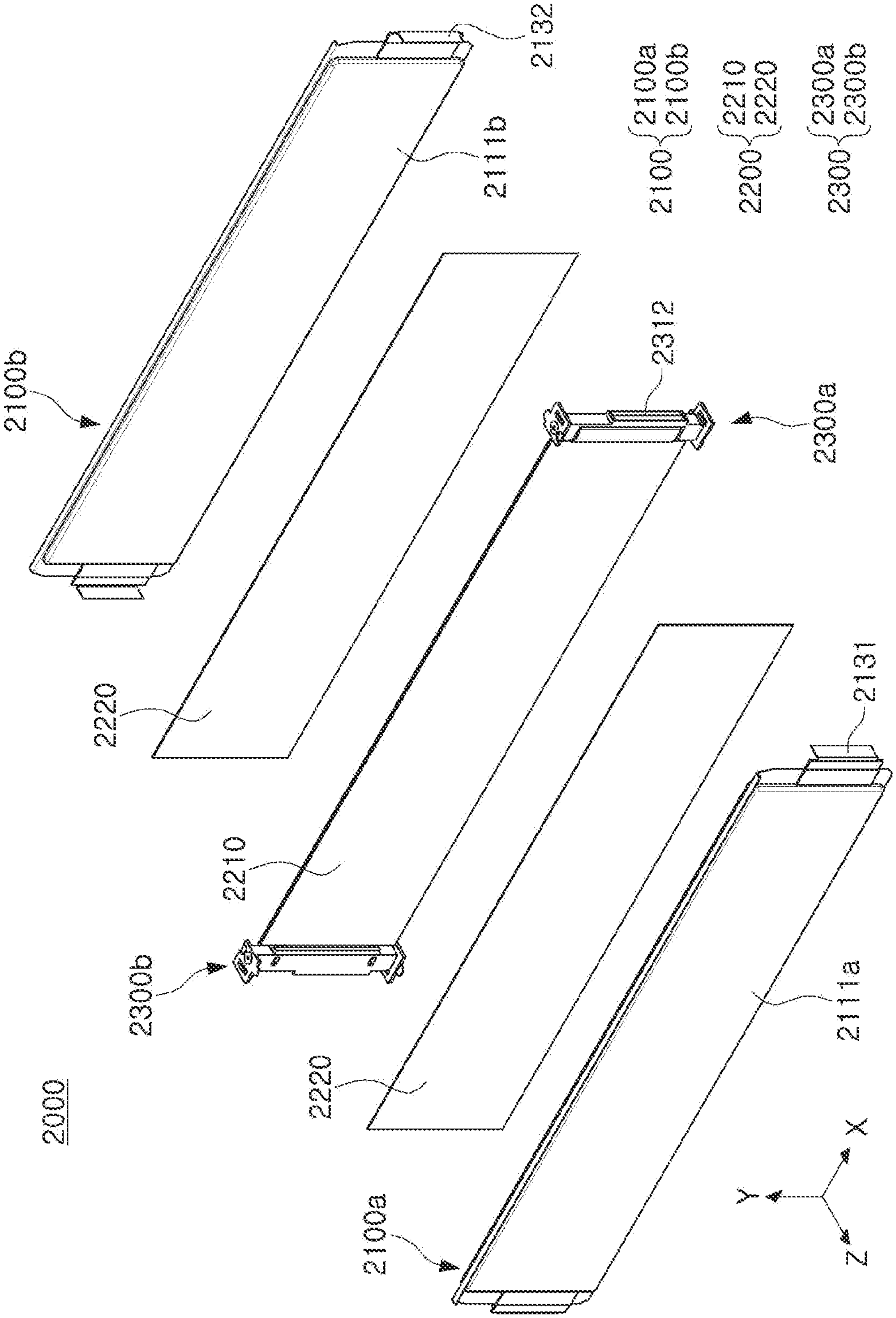
FIG. 3 is an exploded perspective view of a battery cell assembly.
Figure 4:
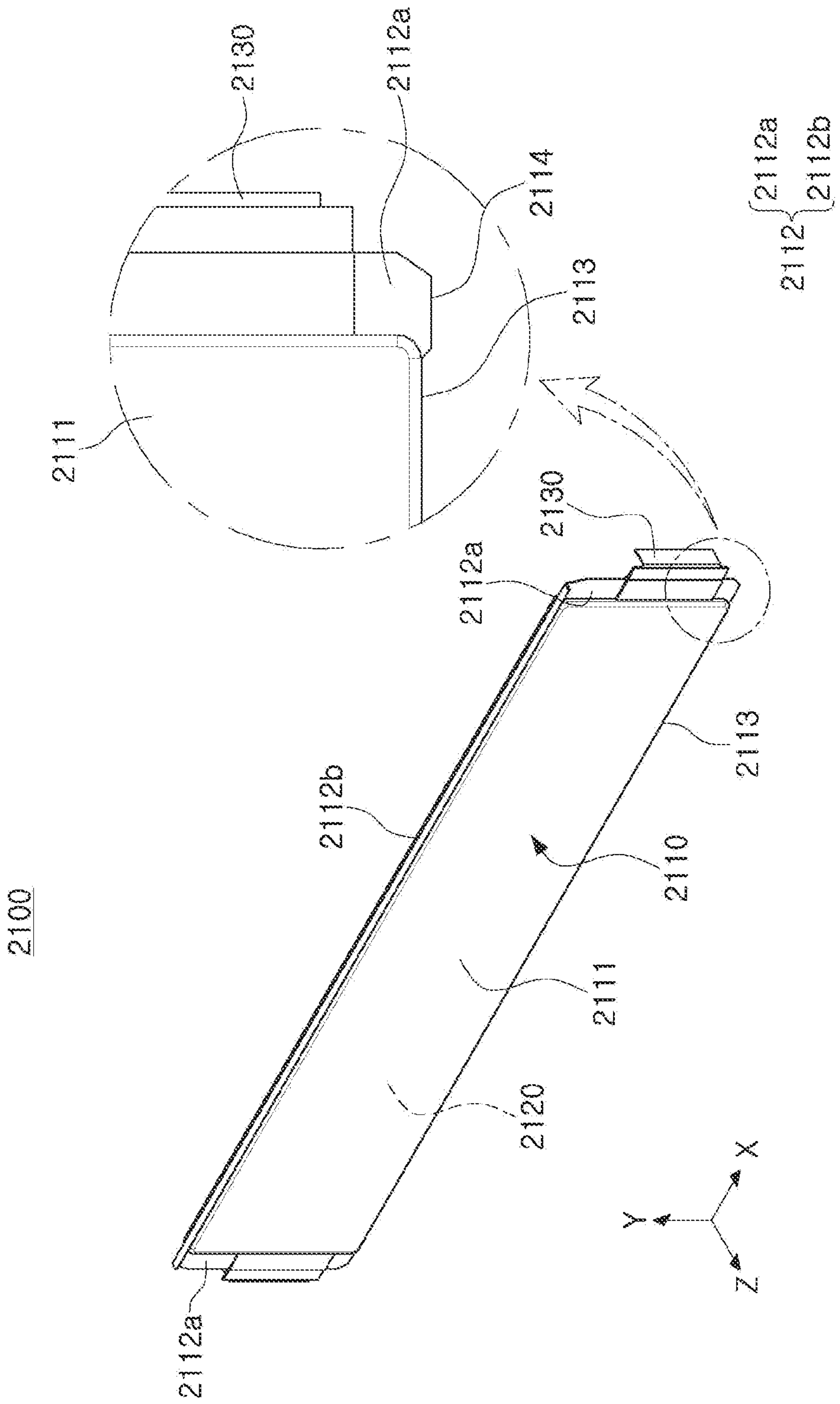
FIG. 4 is a perspective view of a battery cell included in a battery cell assembly.

FIG. 3 is an exploded perspective view of the battery cell assembly 2000 illustrated in FIG. 2. FIG. 4 is a perspective view of the battery cell 2100 according to embodiments.

The battery cell assembly 2000 may include one or more battery cells 2100, a protective member 2200 and a support member 2300. For example, the battery cell assembly 2000 may include a plurality of battery cells 2100 facing each other, a protective member 2200 disposed between the plurality of battery cells 2100, and a support member 2300 coupled to the protective member 2200.

The battery cell assembly 2000 may include a pair of battery cells 2100 capable of outputting or storing electrical energy. For example, as illustrated in FIG. 3, the battery cell assembly 2000 may include a first battery cell 2100*a* and a second battery cell 2100*b* facing each other. The pair of battery cells 2100 may be electrically connected to each other through lead tabs 2131 and 2132. The respective lead tabs 2131 and 2132 may be connected to each other by welding. In this case, a pair of battery cells 2100 may be connected in series or in parallel.

In embodiments, the battery cell 2100 may be a pouch-type battery cell. Referring to FIG. 4, the battery cell 2100 may include a cell body portion 2111 configured in a form in which the electrode assembly 2120 is accommodated in a pouch 2110, and a plurality of lead tabs 2130 electrically connected to the electrode assembly 2120 and exposed to the outside of the pouch 2110.

The electrode assembly 2120 may include a plurality of internal electrode plates. In this case, the internal electrode plate is comprised of a positive electrode plate and a negative electrode plate, and the electrode assembly 2120 may be configured in a form in which the positive electrode plate and the negative electrode plate are stacked with a separator interposed therebetween. The plurality of positive electrode plates and the plurality of negative electrode plates may respectively include an uncoated portion to which an active material is not coated, and the uncoated portions may be connected such that the same polarities come into contact with each other. The uncoated portions having the same polarity may be electrically connected to each other and electrically connected to other external components of the battery cell 2100 through the lead tab 2130. In the case of the battery cell 2100 illustrated in FIG. 4, the two lead tabs 2130 are drawn out from both sides of the cell body portion 2111, but may also be drawn out from any one side of the cell body portion 2111 in the same direction, while having different lengths or heights.

The pouch 2110 surrounds the electrode assembly 2120, forms the exterior of the cell body portion 2111, and provides an internal space in which the electrode assembly 2120 and an electrolyte solution (not illustrated) are accommodated. The pouch 2110 may be formed by folding a sheet of exterior material. For example, the pouch 2110 may be configured in a form in which a sheet of exterior material is folded in half and the electrode assembly 2120 is accommodated therebetween. The exterior material may be formed of a material capable of protecting the electrode assembly 2120 from the external environment, and may include, for example, an aluminum film.

An exterior material may be bonded to an edge of the pouch 2110 to form a sealing portion 2112. A thermal fusion method may be used to join the exterior material for forming the sealing portion 2112, but the present disclosure is not limited thereto.

The sealing portion 2112 may be divided into a first sealing portion 2112*a* formed on a position where the lead tab 2130 is disposed and a second sealing portion 2112*b* formed on a position where the lead tab 2130 is not disposed. To increase the reliability of bonding of the sealing portion 2112 and significantly reduce the area of the sealing portion 2112, at least a portion of the sealing portion 2112 may be formed in a form folded one or more times.

The sealing portion 2112 may not be formed on a surface where the pouch 2110 is folded along one edge of the electrode assembly 2120. A portion where the pouch 2110 is folded along one edge of the electrode assembly 2120 is defined as a folding portion 2113 to distinguish the same from the sealing portion 2112. For example, the pouch (2110)-type battery cell 2100 may have a form of a three-sided sealing pouch in which the sealing portion 2112 is formed on three of the four edges of the pouch 2110 and the folding portion 2113 is formed on the other side.

In this manner, when one sheet of exterior material is folded to wrap the electrode assembly 2120 and the three sides thereof are sealed, on the sealing portion 2112 adjacent to the folding portion 2113, a protruding portion may be formed further protruding in a downward direction (e.g., a negative Y-axis direction in FIG. 4) than the folding portion 2113, due to the thickness of the cell body portion 2111. For example, as illustrated in the partially enlarged view of FIG. 4, a protruding portion 2114 protruding downward of the folding portion 2113 may be formed at a portion extending from the first sealing portion 2112*a* to the folding portion 2113. This protrusion 2114 is called a shark-fin, delta-fin, or bat-ear.

The battery cell 2100 of the embodiments is not limited to the three-sided sealing pouch described above. For example, two sheets of different exterior materials are overlapped to form a pouch, and sealing portions may be formed on all four sides around the pouch. For example, the sealing portion may be composed of sealing portions on two surfaces on which lead tabs are disposed, and sealing portions on the other two surfaces on which lead tabs are not disposed.

In addition, the battery cell 2100 included in the battery cell assembly 2000 of the embodiments is not limited to the aforementioned pouch type battery cell, and may be configured as a cylindrical battery cell or a prismatic battery cell.

Continuing the description with reference to FIG. 3, the protective member 2200 may be disposed between the pair of battery cells 2100. The protective member 2200 may be composed of detailed components that perform various roles. For example, the protective member 2200 is disposed between the first battery cell 2100*a* and the second battery cell 2100*b*, and may include a heat insulating member 2210 that hinders or blocks heat propagation between the battery cells 2100*a* and 2100*b*, and a compression member 2220 applying surface pressure to the battery cell 2100.

The heat insulating member 2210 prevents or blocks the propagation of flame or high-temperature thermal energy between neighboring battery cells 2100, thereby preventing chain ignition of the battery module 200. To this end, the heat insulating member 2210 may include a material having at least one of flame retardancy, heat resistance, heat insulation, and insulation. For example, heat resistance may mean a property that does not melt and does not change shape even at a temperature of 600 degrees Celsius or more, and heat insulation may mean a property that thermal conductivity is 1.0 W/mK or less. For example, the heat insulating member 2210 may include at least a portion of mica, silicate, graphite, alumina, ceramic wool, and aerogel capable of preventing heat and/or flame propagation. However, the material of the heat insulating member 2210 is not limited thereto, and any material capable of maintaining the shape thereof in a thermal runaway situation of the battery cell 2100 and preventing heat or flame from propagating to other adjacent battery cells 2100 may be used as the material of the heat insulating member 2210.

In embodiments, the heat insulating member 2210 may be provided as a plate-like sheet or plate-like pad having a shape corresponding to the cell body portion 2111. However, the shape of the heat insulating member 2210 is not limited thereto, and may be formed in any shape as long as heat propagation between neighboring battery cells 2100 may be blocked with the heat insulating member 2210 interposed therebetween.

One surface of the compression member 2220 may face the heat insulating member 2210 and the other surface opposite to the one surface may face the battery cell 2100. The compression member 2220 may protect the battery cell 2100 from external impact or absorb expansion pressure caused by expansion of the battery cell 2100. Accordingly, thickness expansion due to swelling of the battery cell 2100 may be suppressed to reduce external changes of the battery cell assembly 2000 and performance degradation of the battery cell 2100 due to swelling may be prevented. To this end, the compression member 2220 may include a material capable of absorbing the expansion pressure of the battery cell 2100, and may include, for example, a polyurethane-based material.

The compression member 2220 may be provided as a plurality of compression members 2220. For example, as illustrated in FIG. 3, the compression members 2220 may be respectively disposed on both sides of the heat insulating member 2210. The compression member 2220 may be attached to the heat insulating member 2210. To this end, an adhesive member (not illustrated) may be further disposed between the compression member 2220 and the heat insulating member 2210. However, the adhesive member may be omitted, and the material of the compression member 2220 may also remain attached to the heat insulating member 2210 due to a predetermined adhesive force included the material itself.

The battery cell 2100 may be disposed in contact with the compression member 2220 and adhered to the compression member 2220 by a predetermined adhesive force of the compression member 2220. Alternatively, the battery cell 2100 may be adhered to the compression member 2220 by an adhesive member (not illustrated) disposed between the battery cell 2100 and the compression member 2220. For example, as illustrated in FIG. 3, a pair of compression members 2220 may be disposed with the heat insulating member 2210 interposed therebetween, and the first battery cell 2100*a* and the second battery cell 2100*b* may come into contact with and adhere to a pair of compression members 2220, respectively.

In embodiments, the protective member 2200 may be disposed to cover the cell body portion 2111 of the battery cell 2100. For example, the protective member 2200 may cover the entire surface of the cell body portion 2111*a* of the first battery cell 2100*a*, facing the second battery cell 2100*b*, and may thus block the cell body portion 2111*a* of the first battery cell 2100*a* from directly facing the cell body portion 2111*b* of the second battery cell 2100*b*. Accordingly, transfer of high-temperature thermal energy or impact energy generated from the first battery cell 2100*a* to the second battery cell 2100*b* may be effectively blocked.

In embodiments, the battery cell assembly 2000 may include the support member 2300. The support member 2300 may serve as a structure supporting the battery cell assembly 2000 by being combined with the protective member 2200. For example, the support member 2300 may be combined with the protective member 2200 to support the protective member 2200 and simultaneously support the plurality of battery cells 2100 included in the battery cell assembly 2000. To this end, the support member 2300 may include a material (e.g., a resin material) having a predetermined rigidity.

The support members 2300 may be provided as a pair, and may be spaced apart from each other in a direction (X-axis direction) perpendicular to a direction in which the battery cells 2100 face each other. A pair of support members 2300 spaced apart from each other may be fixed to both ends of the protective member 2200, respectively.

In embodiments, the support member 2300 may include a guide groove 2312 for welding of the lead tab 2130 of the battery cell 2100. The guide groove 2312 is a groove extending in a height direction (e.g., a Y-axis direction) from at least one surface of the support member 2300, and may be provided as a plurality of guide grooves 2312 arranged side by side with each other. At least a portion of the plurality of guide grooves 2312 may be used to weld the lead tabs 2130 of the battery cells 2100 to each other.

The guide groove 2312 may have a shape of a recessed groove formed in at least one surface of the support member 2300, and may guide positions where the lead tabs 2131 and 2132 of the plurality of battery cells 2100*a* and 2100*b* are welded to each other. For example, the lead tab 2131 of the first battery cell 2100*a* and the lead tab 2132 of the second battery cell 2100*b* may be disposed to overlap each other and face the guide groove 2312 of the support member 2300. The lead tab 2131 of the first battery cell 2100*a* and the lead tab 2132 of the second battery cell 2100*b* may be mutually welded along the guide groove 2312. To this end, at least portions of the lead tab 2131 of the first battery cell 2100*a* and the lead tab 2132 of the second battery cell 2100*b* may be bent to face the guide groove 2312. For example, as illustrated in FIG. 3, at least a portion of the lead tab 2131 of the first battery cell 2100*a* may be bent in a direction toward the second battery cell 2100*b*, and at least a portion of the lead tab 2132 of the second battery cell 2100*b* may be bent in a direction toward the first battery cell 2100*a*.

The length of the guide groove 2312 in the Y-axis direction may be greater than the width of the lead tab 2130 of the battery cell 2100 in the Y-axis direction.

The guide groove 2312 may be disposed in a surface of one support member 2300*a* opposite to a surface thereof facing another support member 2300*b*. For example, as illustrated in FIG. 3, the guide groove 2312 may be disposed in a surface of the first support member 2300*a* opposite to a surface thereof facing the second support member 2300*b*. Accordingly, the guide groove 2312 may be disposed on a surface of the support member 2300 facing the outside of the battery cell assembly 2000.

Figure 5:
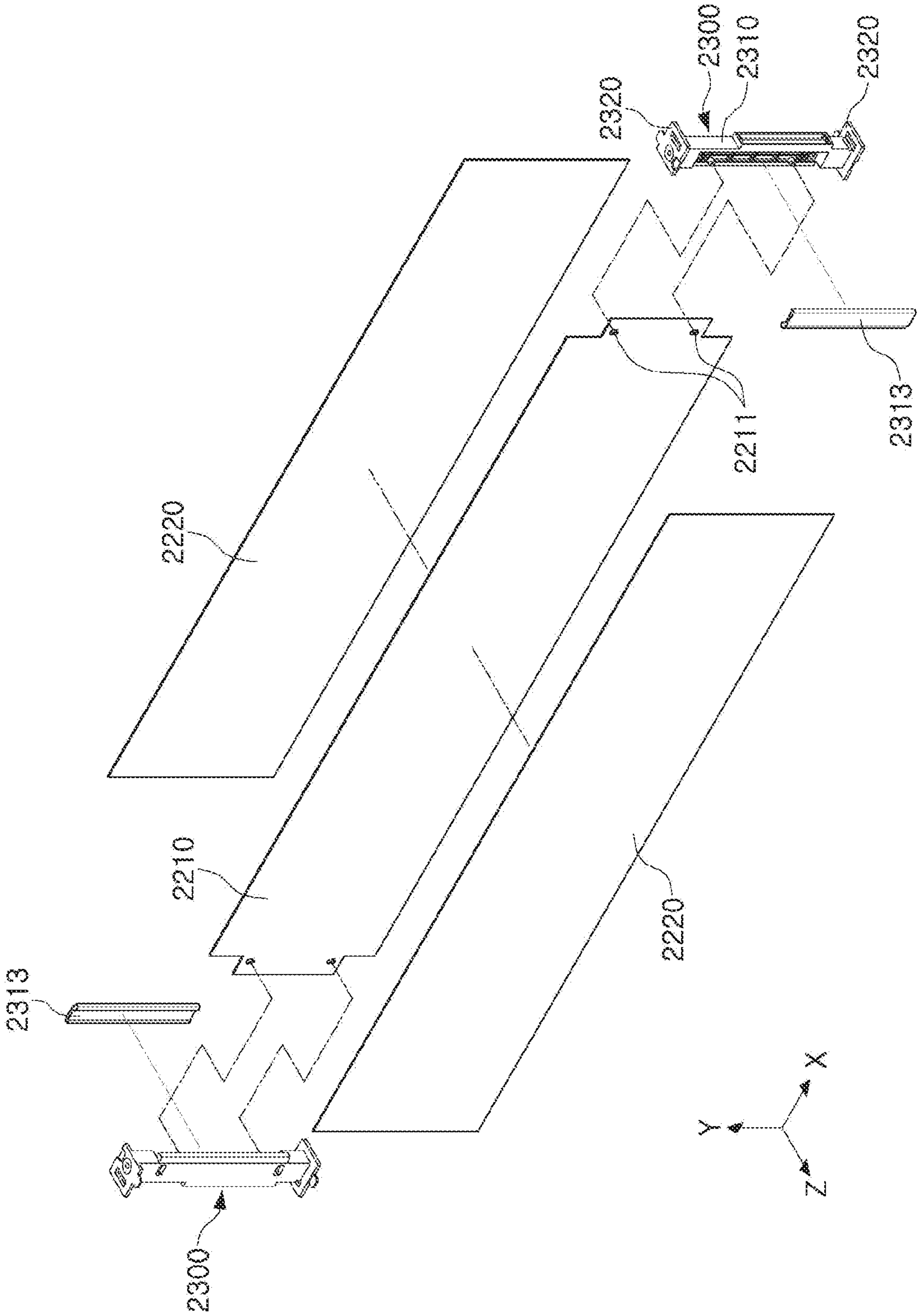
FIG. 5 is an exploded perspective view of a protective member and a support member included in the battery cell assembly.
Figure 6:
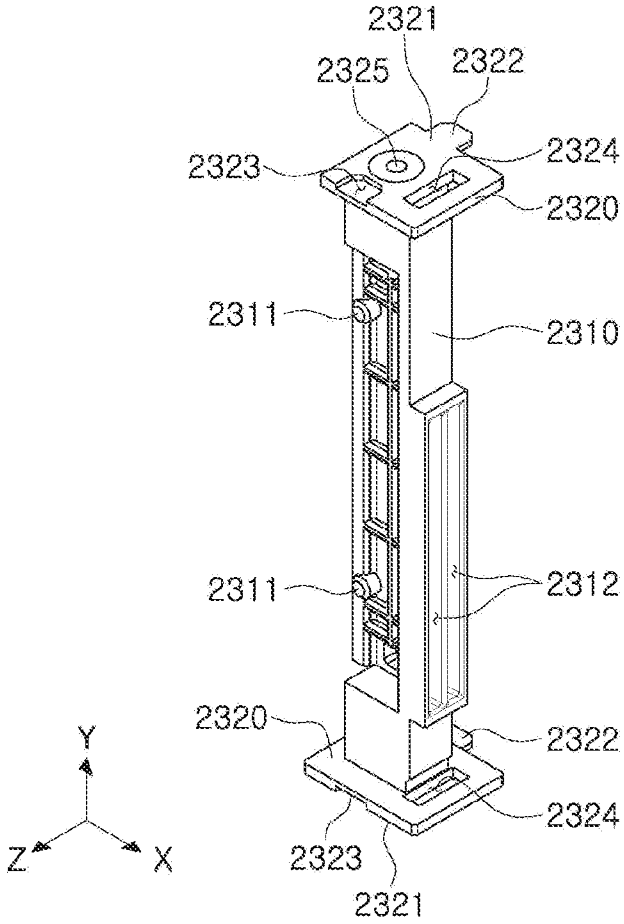
FIG. 6 is a perspective view of a support member included in a battery cell assembly.

Subsequently, with reference to FIGS. 5 and 6, the support member 2300 will be described in detail. FIG. 5 is an exploded perspective view of the protective member 2200 and the support member 2300. FIG. 6 is a perspective view of the support member 2300. The battery cell assembly 2000 and components thereof described in FIGS. 5 and 6 correspond to the battery cell assembly 2000 and the components thereof previously described in FIGS. 1 to 4, and duplicate descriptions are omitted.

The support member 2300 may be coupled to the protective member 2200. When defining a direction, perpendicular to the wide surface of the protective member 2200 as a first direction, a direction parallel to the long side of the protective member 2200 as a second direction, and a direction parallel to the short side of the protective member 2200 as a third direction, a pair of the support members 2300 may be provided and disposed to face each other in the second direction with the protective member 2200 interposed therebetween. (In the following description, the first direction, the second direction, and the third direction may be understood as directions according to the above definition).

The support member 2300 may include a body portion 2310 coupled to the protective member 2200 and a flange portion 2320 disposed on at least one end of the body portion 2310.

Referring to FIG. 5, the support member 2300 may be fastened to and fixed to one end of the heat insulating member 2210. In this case, the heat insulating member 2210 may be fastened to the body portion 2310 of the support member 2300. For example, a fastening groove 2211 is disposed in the end of the heat insulating member 2210, and a fastening protrusion 2311 disposed on the body portion 2310 of the support member 2300 is inserted into the fastening groove 2211 of the heat insulating member 2210 to be fastened thereto. To prevent the heat insulating member 2210 from being separated from the support member 2300, the battery cell assembly 2000 may further include a detachment prevention member 2313 covering a portion where the heat insulating member 2210 and the support member 2300 are coupled. For example, as illustrated in FIG. 5, the body portion 2310 of the support member 2300 and the detachment preventing member 2313 are coupled to each other, and at least a portion of the heat insulating member 2210 may be fastened therebetween. According to this fastening structure, the heat insulating member 2210 may be firmly fixed by being sandwiched between the body portion 2310 and the detachment prevention member 2313. The body portion 2310 of the support member 2300 and the detachment preventing member 2313 may be hook-coupled or coupled with each other using an adhesive, but the coupling method is not limited thereto. Like the support member 2300, the detachment prevention member 2313 may include a material (e.g., a metal or resin material) having rigidity.

In embodiments, the support member 2300 may include flange portions 2320 disposed on upper and lower ends of the body portion 2310. Referring to FIGS. 5 and 6, the flange portion 2320 may be formed wider than the width of the body portion 2310 at upper and lower ends of the body portion 2310. In this case, the upper and lower ends of the body portion 2310 may refer to both ends in the third direction parallel to the short side of the protective member 2200.

The flange portion 2320 may be disposed on both ends of the body portion 2310 in the third direction (e.g., an end in a negative Y-axis direction and an end in a positive Y-axis direction), and may include a support surface 2321 perpendicular to the third direction. The support surface 2321 may be a wide and flat surface formed on at least a portion of the flange portion 2320. When the flange portion 2320 is respectively disposed on both ends of the body portion 2310, the support surfaces 2321 of the flange portion 2320 may form both end surfaces of the support member 2300. For example, as illustrated in FIG. 5, the flange portions 2320 may be disposed at both ends of the support member 2300 in the third direction, respectively. In this case, the support surface 2321 of each flange portion 2320 may form the outermost surface of the support member 2300 in the third direction. In embodiments, the support surface 2321 of the flange portion 2320 may be substantially parallel to a direction (i.e., the first direction), perpendicular to the wide surface of the protective member 2200. In this case, the first direction may be a direction in which the first battery cell 2100*a* and the second battery cell 2100*b* face each other. The battery cell assembly 2000 may be seated on a seating surface (or reference surface) of the outside of the battery cell assembly 2000 through the support surface 2321. For example, the seating surface may be a lower surface of a pack housing in which the battery cell assembly 2000 is accommodated, or a work table on which the cell stack 1000 is to be manufactured.

A coupling protrusion 2322 and a coupling groove 2323 may be disposed on the flange portion 2320. For example, the coupling protrusion 2322 may protrude in a first direction (Z-axis direction) and be inserted into the coupling groove 2323 of another neighboring support member 2300. To this end, one flange portion 2320 may have the coupling protrusion 2322 and the coupling groove 2323 on opposite edges, respectively.

A fastening portion 2325 used to fasten the battery cell assembly 2000 to an external component (e.g., a cover of the battery module 200) may be disposed on the flange portion 2320. The fastening portion 2325 may be fastened with a fastening member (e.g., a bolt). For example, the fastening portion 2325 may have a screw groove capable of screwing with a bolt. Alternatively, the fastening portion 2325 may be formed of a material different from another portion of the support member 2300.

The flange portion 2320 may include a hooking groove 2324 for coupling with a busbar assembly (e.g., 4000 of FIG. 2). For example, the locking groove 2324 may be formed of a groove through which at least a portion of the flange portion 2320 passes, and at least a portion of the busbar assembly (4000 in FIG. 2) is inserted thereinto, such that the busbar assembly (4000 in FIG. 2) and the battery cell assembly 2000 may be mutually coupled.

Figure 7:
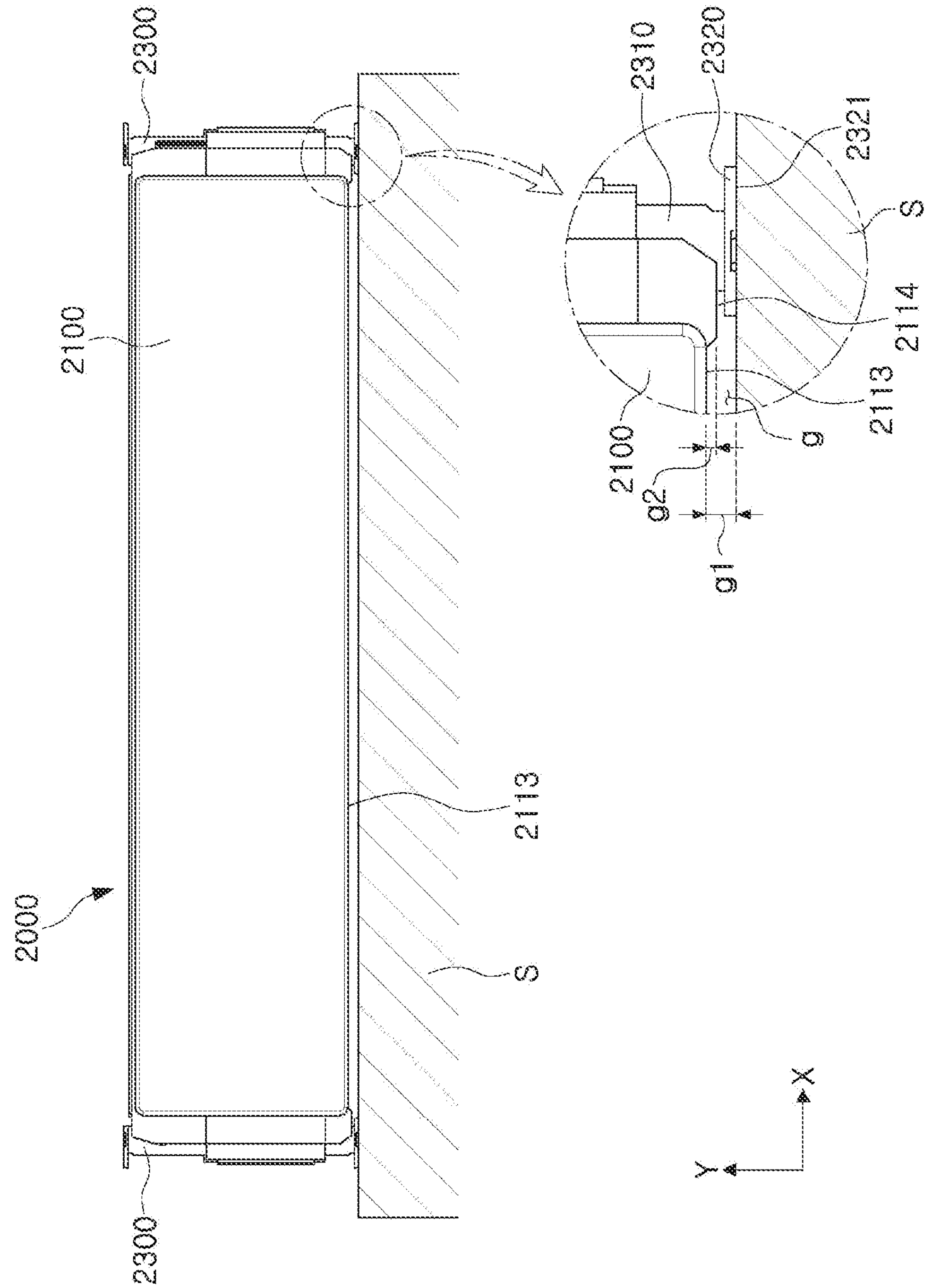
FIG. 7 is an exemplary view illustrating a state in which a battery cell assembly is seated on a seating surface.
Figure 8:
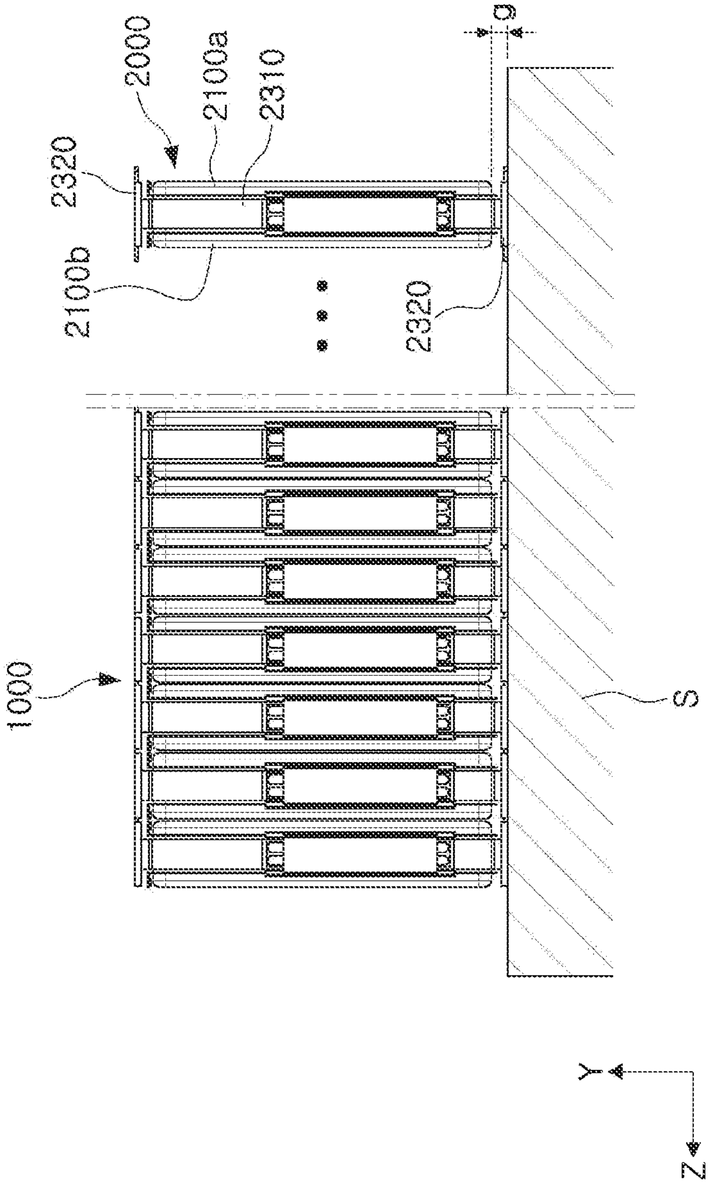
FIG. 8 is an exemplary view illustrating a state in which battery cell assemblies are stacked along a seating surface.

FIG. 7 is a view illustrating a state in which the battery cell assembly 2000 is seated on the seating surface S, by way of example. FIG. 8 is a view illustrating a state in which the battery cell assemblies 2000 are stacked along the seating surface S, by way of example. Referring to FIGS. 7 and 8, the battery cell assembly 2000 may be stably supported through the support surface 2321 such that the folding portion 2113 of each battery cell 2100 faces the seating surface S.

When a stack is formed with only the battery cells 2100 without the support member 2300, it may be difficult to accurately align the individual battery cells 2100 with respect to the seating surface S. The seating surface S described herein may be a workbench for manufacturing of the cell stack 1000 or a pack housing in which the battery cell assembly 2000 is accommodated.

In detail, in the pouch (2110)-type battery cell 2100, due to the flatness of the shark fin 2114 protruding from the folding portion 2113 of the battery cell 2100 or the folding portion 2113 itself, there is a problem in that it is difficult to erect the battery cell 2100 such that the folding portion 2113 faces the seating surface S. However, in the battery cell assembly 2000, the battery cell 2100 may be stably erected on the seating surface S through the flat support surface 2321 of the support member 2300. For example, as illustrated in FIG. 7, the support surface 2321 of the pair of support members 2300 may be disposed lower than the battery cell 2100 in a negative Y-axis direction. Due to this structure, the battery cell assembly 2000 may stand stably on the seating surface S without being disturbed by the shark fin 2114.

In embodiments, a predetermined separation space g may be formed between the support surface 2321 of the flange portion 2320 and the battery cell 2100. For example, the first battery cell 2100*a* and the second battery cell 2100*b* may be spaced apart in a third direction (Y-axis direction) with respect to a virtual line connecting respective support surfaces 2321 of the pair of support members 2300 to each other. Accordingly, the separation space g may be formed between the battery cell 2100 and the external seating surface S that comes into contact with the pair of support surfaces 2321. A gap g1 of the separation space g may be greater than a distance g2 from the folding portion 2113 of the battery cell 2100 to an end of the shark fin 2114.

The battery cell assembly 2000 according to embodiments may be stably supported on the seating surface S (e.g., a workbench for manufacturing the cell stack 1000), by the support surface 2321 of the support member 2300 to which the battery cell 2100 is fixed, and accordingly, the plurality of battery cells 2100 may be accurately stacked and arranged in a direction parallel to the seating surface S.

In embodiments, the folding portion 2113 of the battery cell 2100 included in the battery cell assembly 2000 may be directly exposed to face the seating surface S. The battery module 200 may not have a separate housing or case, and accordingly, a rigid member that hinders heat transfer between the battery cell 2100 and the seating surface S is omitted, and the battery cell 2100 may be disposed directly facing the seating surface S outside the battery module 200. Accordingly, heat dissipation efficiency may be increased in a direction from the battery cell 2100 toward the external seating surface S. Although not illustrated in the drawing, a heat dissipation member (not illustrated) may be additionally disposed between the battery cell 2100 and the seating surface S (e.g., a lower surface of the pack housing) to further increase heat dissipation efficiency. For example, the heat dissipation member (not illustrated) may include a thermal adhesive filling a gap to form a heat transfer path by conduction between the lower surface (e.g., the folding portion 2113) of the battery cell 2100 and the seating surface S. When a heat dissipation member (not illustrated) is disposed, since heat conduction may occur more actively in a direction from the battery cell 2100 toward the seating surface S, it may be more advantageous to maintain a safe temperature of the battery cell 2100.

Figure 9:
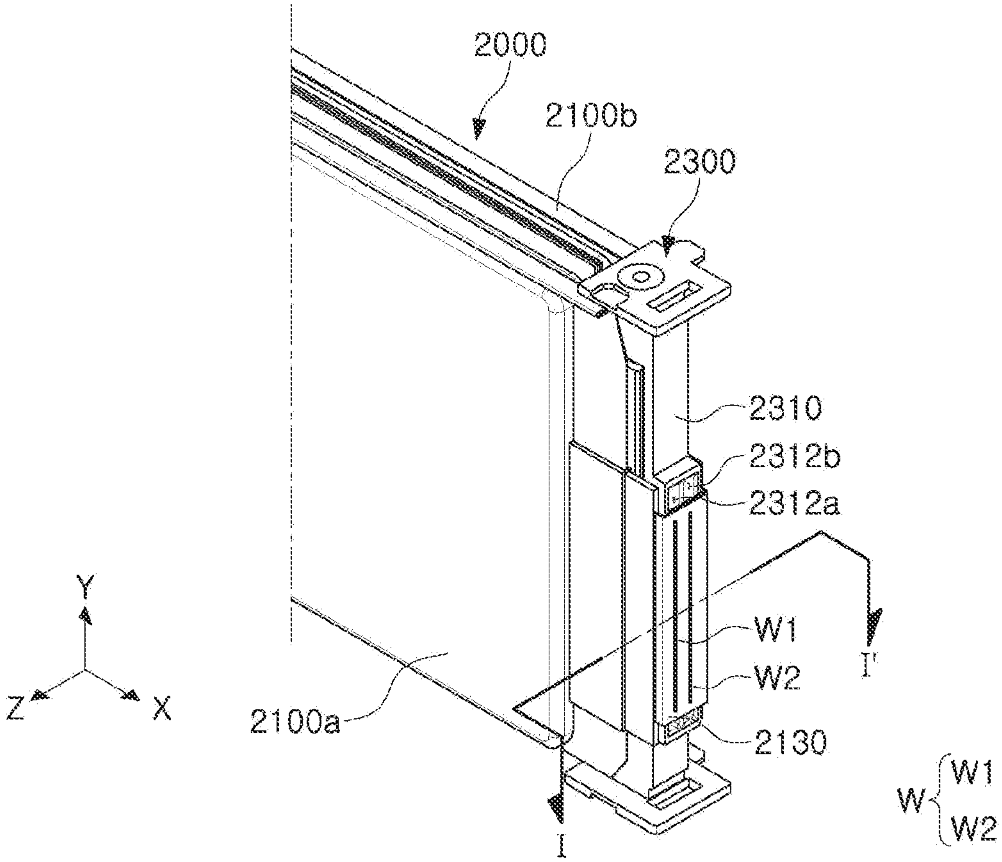
FIG. 9 is an enlarged perspective view of a portion of a battery cell assembly.

Subsequently, electrical connections of the battery cells 2100 included in the battery cell assembly 2000 according to embodiments will be described with reference to FIGS. 9 and 10. FIG. 9 is an enlarged perspective view of a portion of a battery cell assembly 2000 according to embodiments, and FIG. is a cross-sectional view of portion I-I' of FIG. 9. Since the battery cell assembly 2000 described in FIGS. 9 and 10 corresponds to the battery cell assembly 2000 previously described in FIGS. 1 to 7, duplicate descriptions are omitted.

In embodiments, the battery cell assembly 2000 may include a first battery cell 2100*a* and a second battery cell 2100*b* facing each other in a first direction (e.g., a Z-axis direction). The first battery cell 2100*a* and the second battery cell 2100*b* may be electrically connected to each other through lead tabs 2131 and 2132.

The lead tab (hereinafter, first lead tab 2131) of the first battery cell 2100*a* and the lead tab (hereinafter, second lead tab 2132) of the second battery cell 2100*b* may be drawn out from the cell bodies 2111*a* and 2111*b* of the respective battery cells 2100*a* and 2100*b* in a second direction (e.g., an X-axis direction) perpendicular to the first direction (Z-axis direction). At least one of the first lead tab 2131 and the second lead tab 2132 may be at least partially bent. For example, as illustrated in FIG. 10, at least a portion of the first lead tabs 2131 may be bent in a direction toward the second battery cell 2100*b*. At least a portion of the second lead tab 2132 may be bent toward the first battery cell 2100*a*. As the first lead tab 2131 and the second lead tab 2132 are bent respectively vertically, at least portions of the two lead tabs 2130 may be overlapped and brought into contact with each other in the second direction (X-axis direction).

The overlapping portions of the two lead tabs 2131 and 2132 may be coupled to each other by welding. In this case, the welding may be performed by a laser welding method in which a base material (material to be welded) is joined by irradiation with a laser. However, the coupling method of the two lead tabs 2131 and 2132 is not limited to welding, and any coupling method capable of energizing the two lead tabs 2131 and 2132 may be used.

In embodiments, the first lead tab 2131 and the second lead tab 2132 may be respectively bent in opposite directions to at least partially be in face-to-face contact. In the following description, a portion of the first lead tab 2131, in face-to-face contact with the second lead tab 2132, is referred to as a first connection portion 2131*a*, and a portion of the second lead tab 2132, in face-to-face contact with the first lead tab 2131, is referred to as a second connection portion 2132*a*. Referring to FIG. 10, the first connection portion 2131*a* and the second connection portion 2132*a* may be disposed to face the body portion 2310 of the support member 2300 in the second direction (X-axis direction). At least a portion of the first lead tab 2131 and at least a portion of the second lead tab 2132, constituting the connection portions 2131*a* and 2132*a*, may be equal to or greater than a width (e.g., a length in the Z-axis direction) of one surface of the support member 2300.

The connection portions 2131*a* and 2132*a* of the two lead tabs 2131 and 2132 may be welded along the welding regions W1 and W2. At least one of the welding regions W1 and W2 may be set. For example, the welding regions W1 and W2 may be set as continuously extending welding lines. For example, the connection portions 2131*a* and 2132*a* may be welded along two welding lines extending parallel to each other.

Respective welding regions W1 and W2 may be formed to extend in a third direction (Y-axis direction) perpendicular to both the first direction (Z-axis direction) and the second direction (X-axis direction), on the surface of the connection portions 2131*a* and 2132*a* of the two lead tabs 2131 and 2132.

When a plurality of welding regions W1 and W2 are set, one welding region (e.g., W1) may be set to weld the two lead tabs 2131 and 2132 to each other, and the other welding region (e.g., W2) may be set to weld the two lead tabs 2131 and 2132 and another member (e.g., the busbar of the battery module 200) to each other.

One or more guide grooves 2312 may be formed in the body portion 2310 of the support member 2300 so that the two lead tabs 2131 and 2132 may be stably welded. For example, one or more guide grooves 2312 may be formed in a surface of the body portion 2310 of the support member 2300, facing the connection portions 2131*a* and 2132*a*.

For example, the guide groove 2312 may be configured such that a recess recessed in the body portion 2310 in the second direction extends in a third direction (Y-axis direction) perpendicular to the second direction (X-axis direction). The welding regions W1 and W2 for welding the connection portions 2131*a* and 2132*a* of the two lead tabs 2131 and 2132 may be formed along the guide groove 2312. When a plurality of guide grooves 2312 are formed, different welding regions W1 and W2 may be formed along respective guide grooves 2312.

In embodiments, the guide groove 2312 may include a first guide groove 2312*a* and a second guide groove 2312*b* formed parallel to each other. A welding process may be individually performed along each of the guide grooves 2312*a* and 2312*b*. In this case, the welding process may proceed sequentially. For example, in the first welding process, the first lead tab 2131 of the first battery cell 2100*a* and the second lead tab 2132 of the second battery cell 2100*b* may be welded to each other in the first welding region W1 formed along the first guide groove 2312*a*. In the second welding process, in the second welding region W2 formed along the second guide groove 2312*b*, the first lead tab 2131, the second lead tab 2132 and other members (for example, the busbar of the battery module 200) may be welded together. In the manufacturing operation of the battery cell assembly 2000, only the first welding process may be performed. Thereafter, the second welding process may be performed in an operation of coupling the battery cell assembly 2000 and the busbar assembly (e.g., 4000 of FIG. 2) to each other.

The guide groove 2312 may function as a kind of safety space in a welding process. For example, the guide groove 2312 may prevent the battery cell assembly 2000 from being damaged by welding particles or irregular impacts generated from the rear surfaces of the connection portions 2131*a* and 2132*a* or shape deformation of the connection portion during welding.

In embodiments, the first connection portion 2131*a*, the second connection portion 2132*a*, and the guide groove 2312 may overlap in a second direction (X-axis direction). For example, as illustrated in FIG. 10, the guide groove 2312, the first connection portion 2131*a*, and the second connection portion 2132*a* may be sequentially disposed in one direction (e.g., the positive X-axis direction). In this case, one direction (the positive X-axis direction) may be a direction opposite to the direction in which the pair of support members 2300 face each other.

Figure 10:
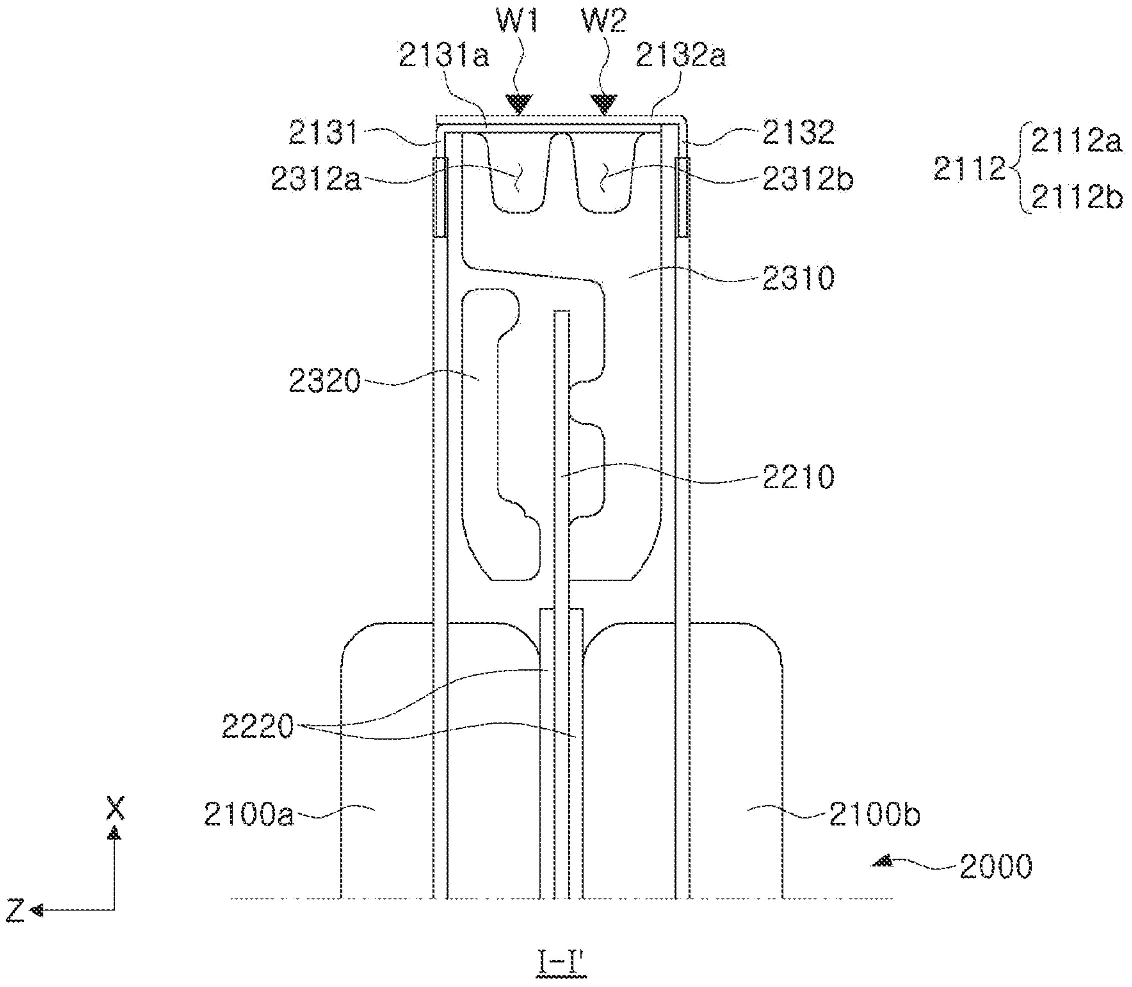
FIG. 10 is a cross-sectional view of portion I-I' of FIG. 9.

FIGS. 9 and 10 illustrate the guide groove 2312 formed in either support member 2300 of the battery cell assembly 2000 and two lead tabs 2130 welded facing the guide groove 2312, and similarly, a guide groove and two lead tabs welded to face the same may be disposed on the support member on the opposite side. For example, the two lead tabs 2131 drawn to both sides from the first battery cell 2100*a* of the battery cell assembly 2000 and the two lead tabs 2132 drawn to both sides from the second battery cell 2100*b* are welded to each other along the guide grooves 2312 of the pair of support members 2300, and thus, the two battery cells 2100 may be electrically connected.

A plurality of battery cell assemblies 2000 including a pair of electrically connected battery cells 2100 may be stacked in one direction to form at least a portion of the battery module 200. Hereinafter, coupling between the plurality of battery cell assemblies 2000 will be described with reference to FIG. 11.

Figure 11:
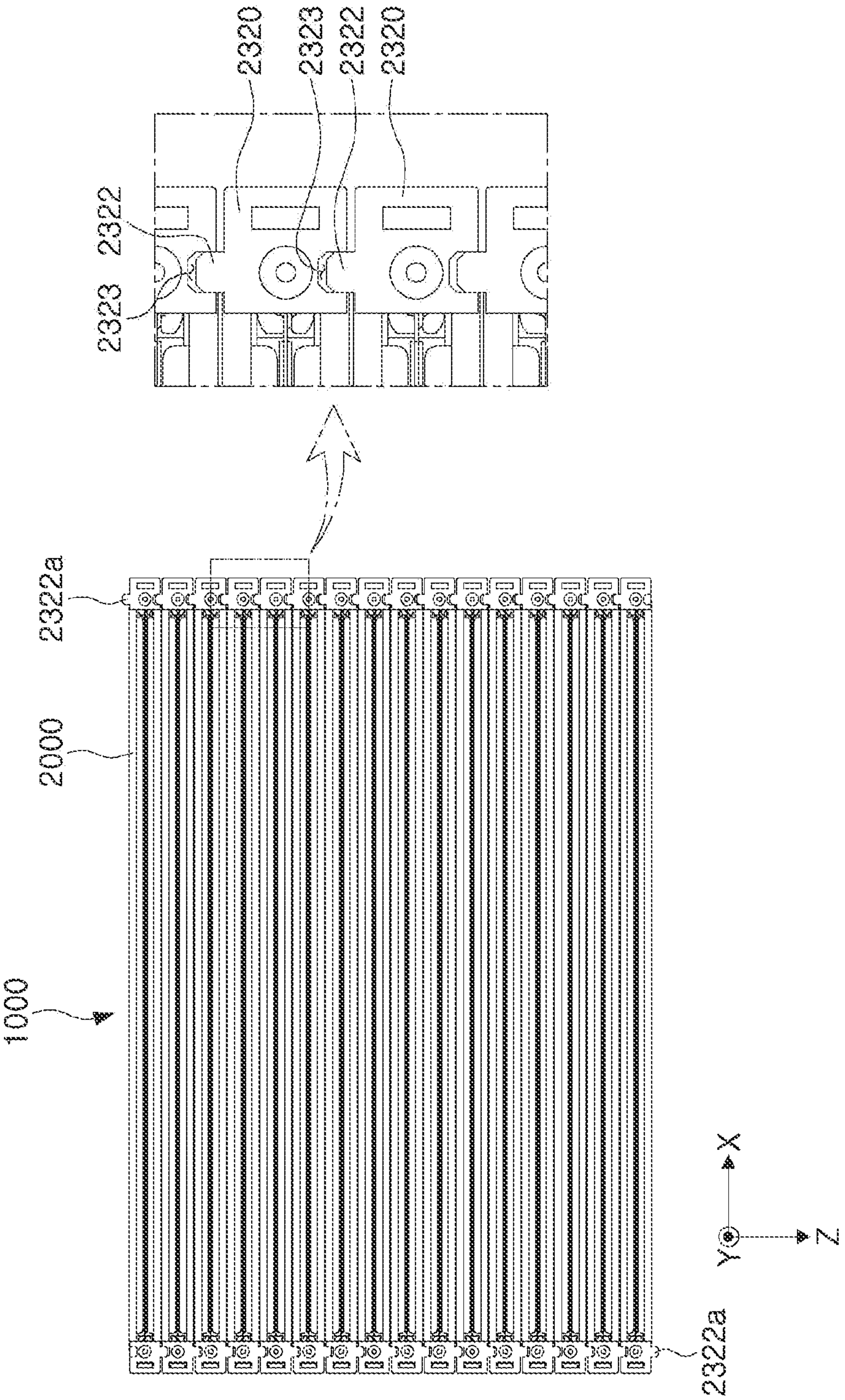
FIG. 11 is a combined top view of a battery cell assembly.

FIG. 11 is a combined top view of a battery cell assembly 2000 according to embodiments. Since the battery cell assembly 2000 described in FIG. 11 corresponds to the battery cell assembly 2000 previously described in FIGS. 1 to 10, duplicate descriptions are omitted.

In embodiments, a plurality of battery cell assemblies 2000 may be stacked in one direction (e.g., Z-axis direction) to form the cell stack 1000. An adhesive member (e.g., 1100 in FIG. 2) having adhesive strength may be disposed between the battery cell assemblies 2000, and thus the battery cell assemblies 2000 may be fixed in a stacked state.

The support member 2300 of the battery cell assembly 2000 may include a coupling guide member that guides the coupling (stacking) of the battery cell assembly 2000. For example, the coupling guide member may include a coupling protrusion 2322 disposed on the support member 2300 of one battery cell assembly 2000 in two battery cell assemblies 2000 facing each other, and a coupling groove 2323 disposed in the support member 2300 of the other battery cell assembly 2000.

The coupling groove 2323 may have a shape of a groove (recess) corresponding to the thickness (e.g., length in the Y-axis direction) or width (e.g., length in the X-axis direction) of the coupling protrusion 2322, such that the coupling protrusion 2322 may be inserted.

Referring to FIG. 11, the coupling protrusion 2322 of one battery cell assembly 2000 is inserted into a coupling groove 2323 of another battery cell assembly 2000 adjacent thereto, to guide such that the battery cell assemblies 2000 may be combined with correct positions.

In embodiments, the coupling protrusion 2322 and the coupling groove 2323 may be disposed on the flange portion 2320 of the support member 2300. For example, the coupling protrusion 2322 may be configured to protrude in a first direction (Z-axis direction) from the flange portion 2320, and the coupling groove 2323 may be configured to be recessed on a side opposite to a portion where the coupling protrusion 2322 protrudes, in the flange portion 2320. Accordingly, the coupling protrusion 2322 of the flange portion 2320 of one battery cell assembly 2000 may be inserted into the coupling groove 2323 of the flange portion 2320 of the neighboring battery cell assembly 2000.

As the battery cell assemblies 2000 are sequentially stacked in the first direction (Z-axis direction), the coupling protrusion 2322 of one battery cell assembly 2000 may be inserted into the coupling groove 2323 of the next battery cell assembly 2000. In this case, to straighten the side surface of the battery module 200, the coupling protrusion 2322 of the battery cell assembly 2000 positioned at the outermost portion in the first direction may be cut.

In embodiments, a pair of support members 2300 included in one battery cell assembly 2000 may each have a coupling guide member. For example, as illustrated in FIG. 11, a pair of support members 2300 included in one battery cell assembly 2000 may include coupling protrusions 2322 protruding in opposite directions, respectively, and coupling grooves 2323 recessed in opposite directions, respectively. For example, when each of the battery cell assemblies 2000 includes a first support member and a second support member, a coupling protrusion 2322 disposed on the first support member of any one battery cell assembly (first battery cell assembly) may be accommodated in a coupling groove 2323 of a first support member of another battery cell assembly (second battery cell assembly) adjacent thereto. In addition, a coupling groove 2323 in which a coupling protrusion 2322 of a second support member of another adjacent battery cell assembly (second battery cell assembly) is accommodated may be disposed in a second support member of one battery cell assembly (first battery cell assembly).

When the coupling grooves 2323 are disposed in the pair of support members 2300 in opposite directions, the user may change the positions of the positive and negative electrodes of the battery cell assembly 2000 and stack the same, if necessary. However, the directions in which the coupling protrusions 2322 protrudes from the pair of support members 2300 are not limited to the above. For example, the coupling protrusions 2322 of the pair of support members 2300 may be configured to all protrude in the same direction.

In embodiments, any one support member 2300 may include a plurality of coupling guide members. For example, as illustrated in FIG. 6, a pair of flange portions 2320 disposed on both ends of any one support member 2300 may include coupling protrusions 2322 protruding in the same direction, respectively. As two coupling protrusions 2322 of the support member 2300 protrude in the same direction, the support member 2300 may be prevented from being turned upside down in the vertical direction (e.g., the Y-axis direction of FIG. 6) and fastened to another support member 2300. However, the protruding direction of the coupling protrusion 2322 in any one support member 2300 is not limited to the above.

In embodiments, since the battery cell assembly 2000 has the coupling protrusion 2322 and the coupling groove 2323 having a shape corresponding thereto, a plurality of battery cell assemblies 2000 may be rapidly stacked and assembled in an accurate position, and erroneous assembly may be prevented in advance.

In the battery module 200 according to embodiments, members such as a housing or a case covering the outside of the cell stack 1000 may be omitted, and the battery cells 2100 of the cell stack 1000 may be directly exposed externally of the battery module 200. Accordingly, heat dissipation efficiency of the battery module 200 may be greatly increased. In addition, the weight of the battery module 200 may be reduced by omitting the housing or case, and the energy density may be further increased while maintaining the same volume.

As set forth above, in the battery cell assembly according to embodiments, a heat insulating member may be disposed between a pair of battery cells to prevent or block heat propagation between the battery cells.

A battery cell assembly according to embodiments may have a simple structure with high assembly efficiency. In addition, battery modules of various sizes may be quickly manufactured by stacking a plurality of battery cell assemblies.

In the battery module including the battery cell assembly according to embodiments, heat dissipation efficiency may be increased by reducing a heat transfer path of battery cells.

While embodiments have been illustrated and described above, it will be apparent to those skilled in the art that modifications and variations could be made without departing from the scope of the present invention as defined by the appended claims.

What is claimed is:

1. A battery cell assembly comprising:

a first battery cell;

a second battery cell disposed to face the first battery cell;

a protective member disposed between the first battery cell and the second battery cell; and a support member coupled to at least one side of the protective member and supporting the protective member, wherein the protective member includes a heat insulating member preventing heat propagation between the first battery cell and the second battery cell, wherein the heat insulating member is inserted into and fastened to the support member, wherein the first battery cell and the second battery cell face each other in a first direction, and the support member includes a first support member and a second support member spaced apart in a second direction, perpendicular to the first direction and respectively coupled to the protective member, wherein each of the first support member and the second support member includes, a body portion coupled to the protective member; and a flange portion disposed on an end of the body portion, wherein the flange portion has a support surface parallel to the first direction, wherein at least one of the first battery cell and the second battery cell is spaced apart in a third direction with respect to a virtual line connecting the support surface of the first support member and the support surface of the second support member, wherein the third direction is perpendicular to both the first direction and the second direction.

2. The battery cell assembly of claim 1, wherein the heat insulating member includes at least one of mica, ceramic wool, or aerogel.

3. The battery cell assembly of claim 1, wherein the protective member further comprises a compression member disposed in at least one of between the first battery cell and the heat insulating member or between the second battery cell and the heat insulating member.

4. The battery cell assembly of claim 3, wherein at least one of the first battery cell and the second battery cell is adhered to the compression member, and the support member is coupled to the heat insulating member.

5. The battery cell assembly of claim 1, wherein the flange portion includes a coupling protrusion protruding in the first direction.

6. The battery cell assembly of claim 5, wherein the flange portion further includes a coupling groove disposed on an opposite side of a protruding side of the coupling protrusion, wherein a shape of the coupling groove corresponds to a shape of the coupling protrusion.

7. The battery cell assembly of claim 1, wherein the first battery cell includes a first lead tab at least partially bent, and the second battery cell includes a second lead tab contacting the first lead tab.

8. The battery cell assembly of claim 7, wherein the first lead tab includes a first connection portion contacting the second lead tab, and the second lead tab includes a second connection portion in contact with the first connection portion, wherein the first connection portion and the second connection portion face the first support member in the second direction.

9. The battery cell assembly of claim 8, wherein the first support member includes one or more guide grooves disposed on a surface facing the first connection portion and the second connection portion, and the first connection portion and the second connection portion are welded to each other in a welding region provided along the one or more guide grooves.

10. The battery cell assembly of claim 9, wherein the one or more guide grooves, the first connection portion and the second connection portion are sequentially disposed in a direction opposite to a direction from the first support member to the second support member.

* * * * *